Figure 1:
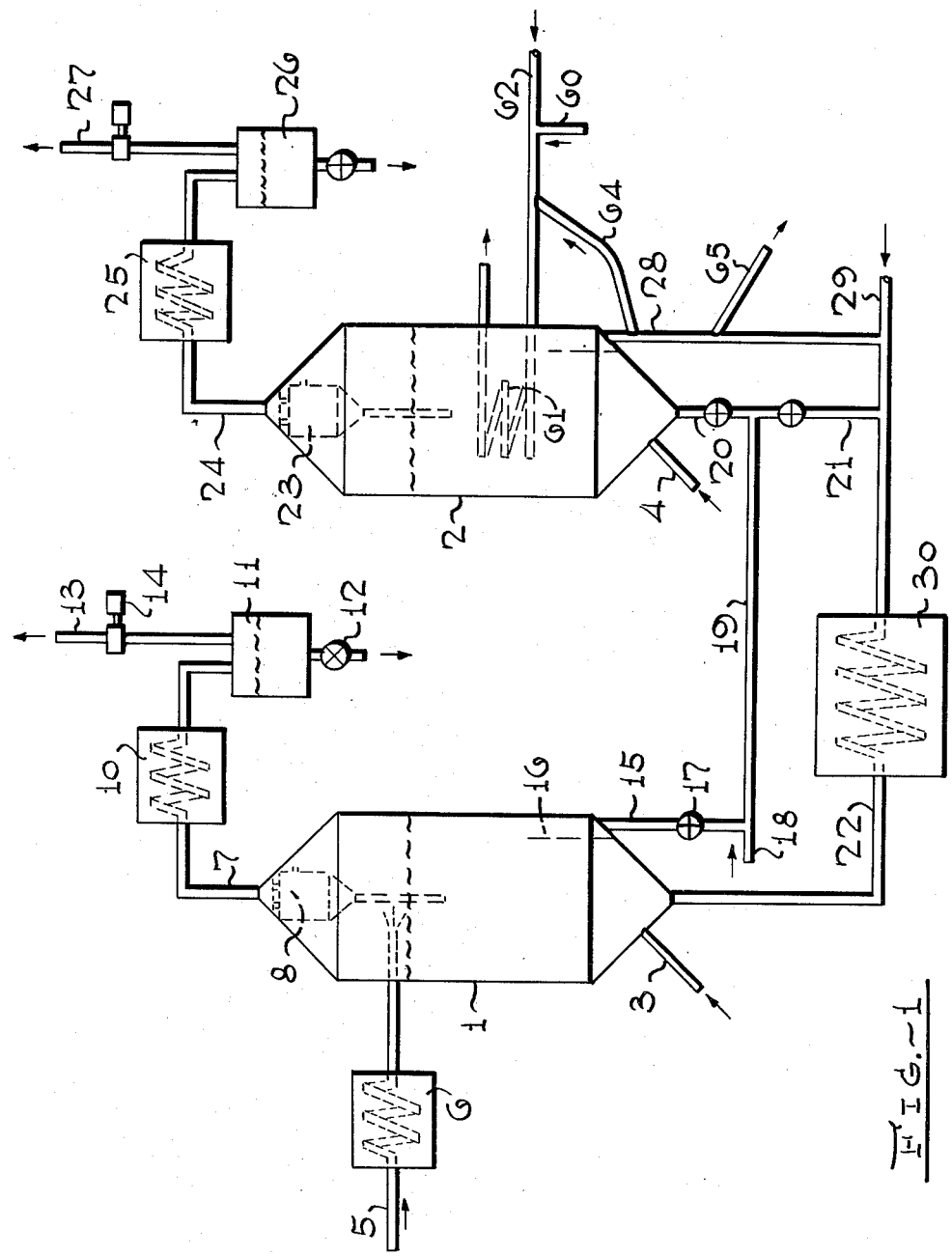

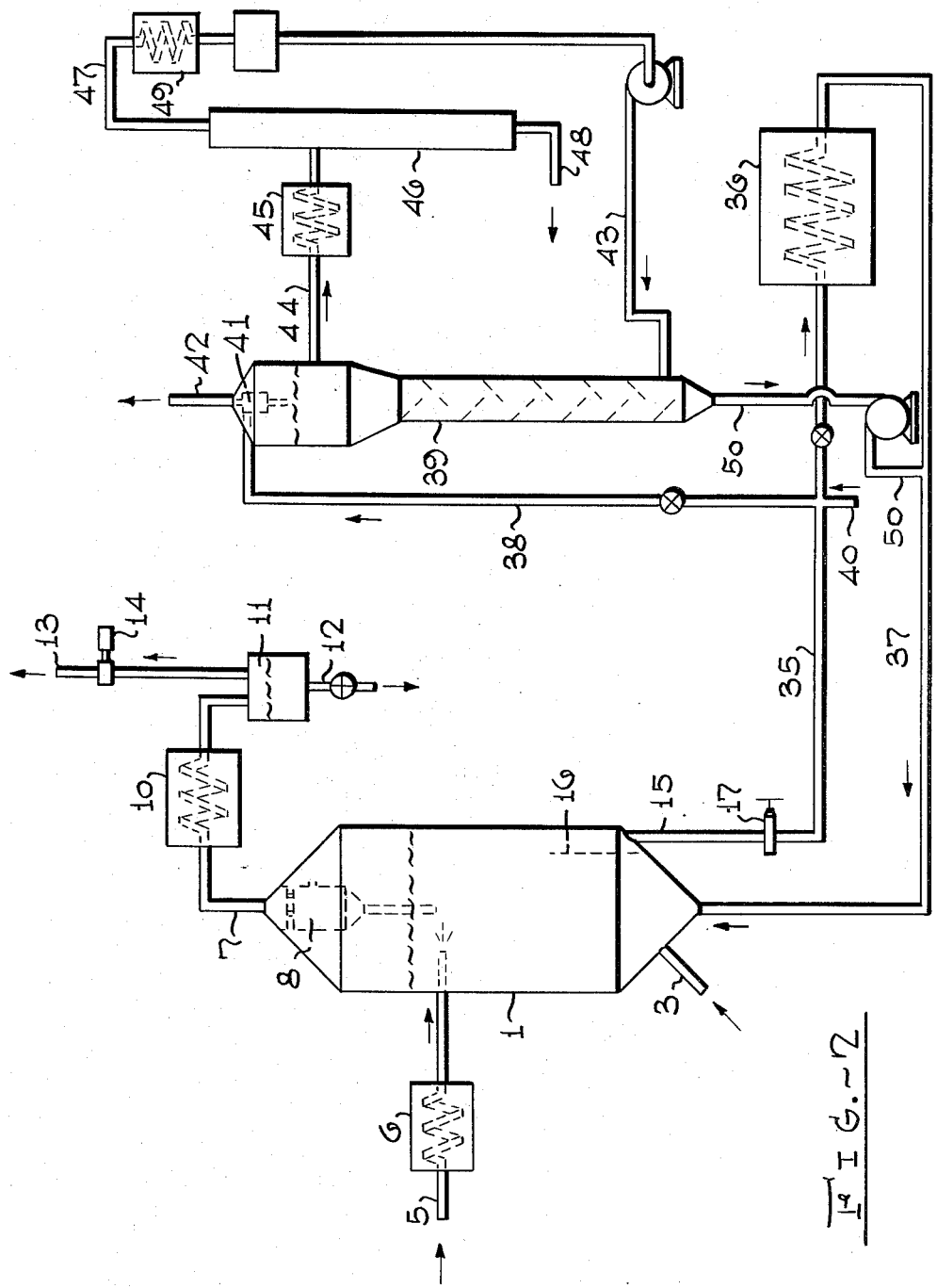

United States Patent Office 2,758,073
Patented Aug. 7, 1956

2,758,073

FLUIDIZED SOLIDS DISTILLATION PROCESS

Robert W. Krebs and Charles N. Kimberlin, Jr., Baton Rouge, La., assignors to Esso Research and Engineering Company, a corporation of Delaware Application September 4, 1952, Serial No. 307,864

5 Claims. (Cl. 202—72)

This invention concerns a novel distillation procedure in which a distilland is supplied to a hot bed of fluidized solids, resulting in vaporization of a distillate product and resulting in liquid absorption of the undistilled constituents on the fluidized solids. Thereafter the liquid is removed from the fluidized solids by a solvent washing technique or a drying procedure to provide the distillation split required.

The subject matter of this invention constitutes a continuation-in-part of the subject matter of U. S. application, Serial No. 232,523, filed June 20, 1951. In that said application a procedure is disclosed and claimed for the coking of heavy residual petroleum oils including distillation of lighter boiling constituents from the residual oils in the presence of hot fluidized particles. The present invention extends and improves the distillation procedure by providing means to separate the lower boiling and higher boiling components of a liquid feed material.

It is presently contemplated that this invention is of particular application to the distillation of liquids which tend to be easily decomposed by normal distillation temperatures when employing the usual distillation procedures. Animal and vegetable oils, fatty acids, naphthenic acids and the like are examples of such materials. At the present time techniques known as molecular distillation or short-path distillation are employed for distilling constituents of this character. However, the apparatus required for presently known short-path distillation processes is cumbersome, costly and frequently inefficient. The present invention provides a simple and effective distillation process providing the advantages of short-path or what could better be called "film distillation" by utilization of relatively simple low cost equipment of high capacity.

The present invention utilizes and depends upon the properties of fluidized solids. In fluidized solids processing, a critical amount of gas is passed upwardly through a bed of solid particles in a manner to impart fluid characteristics to these particles. To secure this objective a superficial gas velocity of about 0.5 to 2.5 feet per second is maintained. This gas velocity serves to fluidize the solid particles which are preferably of a size ranging from about 40 to 400 standard mesh. The fluidized particles have the general appearance of a boiling liquid, are characterized by a definite level, and can be permitted to flow from one vessel to another in the manner of a liquid. The density of such a fluidized bed is about 20 to 50 lbs. per cubic foot.

A fluidized bed of solid particles of this nature is extremely turbulent and is characterized by a high coefficient of heat transfer. Because of these characteristics, close temperature control can readily be maintained in a fluidized bed. It is also apparent that a bed of fluidized solids, having the particle size suggested above, is characterized by an extraordinarily large total surface area. It is these characteristics of a fluidized bed of solid particles which are utilized in the present invention.

Thus, if a fluidized bed of particles is maintained at an elevated temperature under atmospheric or sub-atmospheric pressures and a distillable liquid is sprayed onto the fluidized bed, exposure of the liquid in the form of a thin film on the enormous solid surface of the particles at the elevated temperature of the particles, will cause effective film distillation. The distillation process necessitates means to prevent concentration of liquid on the solids from exceeding a critical value. Thus, it has been found that the fluidized properties of solids may be maintained even though an appreciable amount of liquid is contained on the solids although fluidization becomes impossible when the amount of liquid on the solid exceeds about 2 to 20 wt. percent. The particular limiting value of liquid tolerance depends upon the particular liquid and solid system and cannot be arbitrarily stated for any liquid-solids system. For example, in the case of liquid hydrocarbons and solid particles of porous structure such as silica gel, such a system may tolerate about 20% of liquid on the solids before fluidization becomes impossible. However, the effectiveness of the process for obtaining distillation without undesirable chemical decomposition is improved by maintaining the liquid loading on the solids at a low level. It is believed that the reason for this is that very thin films of liquid which are spread on the surface of the solid give the maximum opportunity for vaporization of the volatile constituents. For this reason it is preferred to maintain the loading of liquid on solids even lower than the critical value at which fluidization becomes difficult. Liquid loadings below about 2 to 5% liquid on solids are preferred, although with easily distilled feeds that are not too readily decomposeable, loadings as high as 10% or higher may be tolerated. Consequently, as an essential feature of this invention, means are provided to limit the build-up of liquid on the fluidized particles to values below the critical value for fluidization referred to, and lower values for the liquid build-up are usually preferred.

Towards this end, during conduct of the distillation, a portion of the fluidized solids is continuously removed from the distillation zone together with liquid absorbed on the solids. These withdrawn solids are subjected to solvent washing, or heating, to remove the adsorbed liquids and to permit recycle of the dried solids to the distillation zone. The present invention particularly concerns the manner in which the liquid content of fluidized solids in a distillation zone is controlled.

The nature of this invention may be understood by referring to the following drawings, in which:

Figure 1 diagrammatically illustrates a flow plan and the apparatus to be used embodying two fluidized solids distillation zones, and Figure 2 shows a preferred embodiment of the invention utilizing a primary distillation zone in conjunction with solvent washing facilities for removing residual products from the fluidized solids.

Referring first to Figure 1, two fluidized solids zones identified by numerals 1 and 2 are illustrated. These zones comprise a first and second distillation zone permitting the segregation of a first and second distillate fraction from a feed material. The operation of the two zones is substantially the same except that the second zone is operated at a substantially higher temperature than the first zone. Each of the distillation zones is provided with a fluidized bed of hot particles. The particles are preferably of a size in the range of about 200 microns to present the maximum amount of surface without encountering excessive loss of solids. A wide variety of particles may be used, although for the purposes of this invention it is essential that the particles be inert with respect to the distilland and any constituents thereof. It is particularly desirable to employ finely divided solids such as coke, silica, pumice, kieselguhr, or the like, which are characterized by a coarse pore structure providing large amounts of surface area. However, nonporous solid particles such as sand, crushed glass, or metal powders may also be used. In general it is preferred not to use solids having an extremely fine porous structure such as certain activated carbons or gels having very fine pores from which it is difficult for vapors to escape. In each of the fluidized zones particles of this character are fluidized by upward passage of gas through the particles. Thus, in Figure 1 gas introduction conduits 3 and 4 are provided in zones 1 and 2 respectively, for permitting the upflow of gas through the solid particles at the flow rates stated, to cause fluidization of the particles. Again, for the purposes of this invention, the gas employed as the fluidizing agent must be inert with respect to the material to be distilled. In place of noncondensable gases, vapors of relatively low boiling normally liquid materials may be used as the fluidizing gas; in such cases it is preferred that the fluidizing vapor be of such a nature that it may be easily separated from the distillate. Natural gas, nitrogen, carbon dioxide, air, steam, normally gaseous hydrocarbons, or low boiling normally liquid hydrocarbons may be employed as the fluidizing gas.

As indicated, therefore, a hot bed of fluidized particles is maintained in the primary distillation zone 1. The manner in which the temperature of these particles is controlled will be hereinafter described. A liquid to be distilled is introduced to the distillation zone through line 5, and may include passage of the liquid through a preheater 6, operative to heat the liquid to elevated temperatures. The liquid is then preferably sprayed onto the fluidized solids in the distillation zone. Since zone 1 is operated at atmospheric or subatmospheric pressures, the drop in pressure on the liquid when sprayed into zone 1 may result in some flash vaporization of a portion of the more volatile components of the distilland. However, the bulk of the liquid will be deposited on the fluidized solids in the form of a thin film of extensive surface area from which evaporation may proceed. This is facilitated by contact of the film of sprayed liquids with hot fluidizing gas rising upwardly through and from the hot fluidized particles. The required heat of vaporization is abstracted from the fluidized particles, thus causing a lowering in temperature of the latter. Preferably all vapors removed from zone 1 are passed through a cyclone separator or the like, diagrammatically indicated by numeral 8. Such a separator includes a dip leg extending downwardly into the bed of fluidized particles for the return of entrained particles.

Unvaporized liquid from the spray injection system will drop downwardly onto and into the bed of fluidized particles to be adsorbed thereon. By virtue of the heat content of the fluidized particles, again aided by the hot fluidizing gas passing upwardly through the zone, volatile constituents of liquid adsorbed on the particles will be vaporized due to the high heat transfer coefficient, and particularly the high amount of evaporation surface, characteristic of a bed of fluidized solids. This vaporization will readily occur, resulting in the immediate distillation overhead of all constituents of the feed liquid vaporizable at the conditions of temperature and pressure maintained in zone 1. The remaining unvaporized liquid constituents of the distilland will remain adsorbed on the surface of the fluidized particles.

Distillate vapors together with the inert fluidizing gas are removed overhead from zone 1 through line 7. These vapors are passed through a condensing zone 10 and thence to a condensate receiver 11, both of which are operated to permit separation of liquefied distillate, which may be removed from vessel 11 through line 12. The uncondensed fluidizing gas is then removed through line 13. A vacuum pump 14 may be positioned in line 13 so as to maintain subatmospheric pressures in zone 1.

In order to remove unvaporized liquid constituents from the fluidized solid particles, fluidized solids are continuously withdrawn from zone 1 through line 15 associated with the downcomer baffle 16. A slide valve, or the like, 17, may be used to control withdrawal of the fluidized solids. Sufficient solids are to be withdrawn so as to remove sufficient adsorbed liquid from zone 1 to prevent build-up of liquid on the solids above the limits of tolerance imposed by the requisites of fluidization. Injection of a fluidizing gas through line 18 serves to force the withdrawn solids through line 19. All or at least a portion of the fluidized solids of line 19 are passed into the second distillation zone 2 through line 20. As will be described, in some cases, a portion of the solids of line 19 may be directly recycled to zone 1 through lines 21 and 22. The solids introduced to zone 2 through line 20 containing the higher boiling adsorbed liquid constituents of the distilland are fluidized by gas introduced through line 4. In a preferred form of the invention the fluidizing gas of line 4 constitutes hot flue gas, superheated steam, or the like, serving to heat the solids in zone 2 to an elevated temperature. The solids in zone 2 may also be heated by other means to a temperature suitable for the vaporization of the higher boiling constituents of the distilland. For example, the desired heat may be provided by the combustion of a fuel in a coil immersed in the fluidized solids bed in zone 2; for this purpose fuel such as natural gas, oil, or finely divided coke introduced by line 60 may be burned in coil 61 by means of air introduced by line 62. It is desired that the temperature in zone 2 be maintained at a substantially higher level than the temperature in zone 1 so that the higher boiling components of the distilland which are not vaporizable in zone 1 may be substantially completely vaporized in zone 2 and collected as an overhead product. In this manner the process provides for the separation of the distilland into a lower boiling overhead fraction from zone 1 and a higher boiling overhead fraction from zone 2. This heating, concomitant with fluidization causes the effective vaporization of all liquid remaining on the fluidized solids. The vapors may then be removed through the cyclone separator 23 and overhead line 24 together with the fluidizing gas. Again, these vapors may be condensed and separated from the fluidizing gas by means of condenser 25 and liquid separator 26. If desired, the vent 27 from the liquid separator may again be equipped with a vacuum pump so that zone 2 like zone 1 may be operated at pressures below atmospheric.

As described, use of hot fluidizing gas in zone 2 serves to heat and dry the fluidized solids while causing distillation of residual liquid adsorbed on the solids. The dry solids may be removed from zone 2 through line 28 for recycle back to zone 1 through line 22, aided by fluidizing gas introduced through line 29.

It will be observed that, as described, withdrawal of solid particles from zone 1 is carried out for two reasons. In the first place, solids are withdrawn as described to permit drying of the fluidized solids and to permit removal of high boiling products of the distilland. Secondly, the solids are withdrawn in order to externally heat these solids to the temperature levels required in zone 1. In one method of operation, all solids withdrawn from zone 1 through line 19 may be passed through line 20 to zone 2. These solids, after drying and heating in zone 2, are then recycled through lines 28 and 22 to zone 1. Particularly in the case however when small quantities of residual products are adsorbed on the solids, it is not necessary to pass all solids from zone 1 into zone 2. In this case a portion of the solids of line 19 may be passed through line 21 for direct recycle back to zone 1 while bypassing zone 2. In this case a heat exchanger 30 is preferably positioned in line 22 for the heating of the portion of solids recycled directly back to zone 1. The amount of heat to be supplied by the solids heater 30 is determined by the relative portions of solids passed to zone 2 and the heat level required in zone 2 to drive off residual products.

The proportion of the distilland removed overhead in the lighter fraction by line 7 may be controlled within wide limits by suitable co-adjustment of (1) the temperature of zone 1, (2) the amount of fluidizing gas employed, and (3) the rate of solids withdrawal by line 15. The rate of solids withdrawal by line 15 controls the residence time of the solids in zone 1 and, therefore, the length of time the adhering film of distilland is exposed in zone 1 to vaporizing conditions. Thus in zone 1 it is desired to adjust the vaporizing conditions such that a partial vaporization of the distilland is achieved; in zone 2 conditions are so adjusted as to provide for the vaporization of substantially all of the remaining portion of the distilland which has not been vaporized in zone 1. In both of zones 1 and 2 temperature conditions are maintained such that evaporative distillation occurs in each of these zones while at the same time substantially no chemical decomposition of the components of the distilland takes place.

It is apparent that many different methods may be employed to operate the process of Figure 1 in connection with the method used to heat the fluidized solids in the two zones. The fluidized solids may be heated directly in the distillation zones by introduction of hot gases as the fluidizing gases, or in some cases, by partial combustion of constituents in the distillation zone. However, it is generally preferred that the solids be heated in the manner described to permit extraneous heating of the solids prior to introduction of the heated solids to the distillation zone. By this means closer temperature control is possible without exposure of the distilland to undesirably elevated temperatures.

Referring now to Figure 2, a different embodiment of the invention is illustrated in which a solvent washing procedure is used to recover the higher boiling liquid products from the fluidized solids. In Figure 2, distillation zone 1, and auxiliary equipment for use therewith, is of the same nature as indicated in Figure 1. Corresponding portions of the apparatus are consequently identified by similar numerals. Thus, the operation of distillation zone 1 in Figure 2 is of the same nature described in connection with Figure 1. Fluidized solids are continuously removed from zone 1 through line 15 and are passed through line 35 for heating and for solvent washing. Thus, a portion of the solids of line 35 are separated and passed to solids heater 36 and thence are directly recycled through line 37 to distillation zone 1. A sufficient circulation of solids through the solids heater 36 is maintained to fix the desired temperature levels in zone 1. A portion of the solids of line 35 are also separated through line 38 for introduction to the solvent washing zone 39. Fluidizing gas is preferably introduced to the base of line 38 through line 40 to carry the solids through line 38 to the cyclone separator 41 at the top of solvent wash tower 39. The fluidizing gas together with any vapors removed from the solids may be vented through line 42 while the solids together with adsorbed liquid constituents are dropped downwardly into tower 39. A suitable wash solvent is passed through line 43 for introduction to the bottom of tower 39. This wash solvent is passed upwardly through the tower, and through packing which may be maintained in the tower, countercurrently to the flow of solids dropping downwardly through the tower. The solvent removed from the top of zone 39 through line 44 thus contains the liquid constituents stripped from the solids. The stream of line 44 constituting solvent plus liquid stripped from the solids is then passed through a heater 45 and is introduced to a conventional distillation zone 46, operated to drive solvent overhead through line 47 and to permit removal of the higher boiling components through line 48. The solvent may be cooled in condenser 49 and condensed and recycled through line 43.

The solvent to be employed in this operation will depend upon the nature of the distilland and the residual products adsorbed by the fluidized solids in the distillation zone. It is only necessary that a solvent chosen be capable of washing residual liquid products from the solids and that the solvent have a substantially lower boiling point than the residual liquid products.

Solids from wash zone 39 may be removed from zone 39 as a slurry of solids in the solvent. This slurry is pumped through line 50 and combined with the heated solids of line 37 for return to distillation zone 1. Solvent following this course will be distilled in zone 1 and will be removed overhead through line 7. The solvent is preferably chosen so that under the conditions required to condense the desired distillate product, the solvent will pass overhead as a vapor through line 13. This solvent may be recovered and recycled to solvent washing zone 39 as desired.

As described, the distillation process of this invention requires the contact of a liquid to be distilled with a hot bed of fluidized solids. This contact results in the vaporization of volatile portions of the distilland, permitting removal of a distillate product overhead from the fluidized zone. The higher boiling components of the distilland are adsorbed by the fluidized solids and are continuously removed with a portion of the fluidized solids. In one form of the invention, the fluidized solids are externally dried and heated and are then recycled to the distillation zone. In this form of the invention, as described, two fluidized solids distillation zones are operated at different temperature levels to permit separation of a higher and lower boiling portion of the distilland. It is apparent that if desired, any number of distillation zones may be used, each operated at different temperature levels to permit fractionation of the original feed material. In a different embodiment of the invention solids removed from the primary distillation zone are subjected to solvent washing with a lighter boiling solvent so as to remove residual liquids from the solids.

What is claimed is:

1. A process for the distillation of a liquid feed material having lower boiling components and higher boiling components which comprises the steps of: passing gas upwardly through a bed of heated solid particles in a manner maintaining said particles as a fluidized bed, contacting said liquid feed material with said fluidized particles at a temperature insufficient to effect any substantial chemical decomposition of said components while effecting vaporization of the said lower boiling components and leaving higher boiling components unvaporized, withdrawing and segregating overhead from said bed a vapor stream comprising lower boiling components of said liquid feed material, withdrawing at least a portion of said solid particles from the bed together with higher boiling liquid components of the feed material, separating and recovering from said withdrawn particles said last named higher boiling liquid components substantially without chemical decomposition of said components, heating said particles and recycling said particles to the fluidized bed.

2. A process for the distillation of a liquid feed material having lower boiling components and higher boiling components which comprises the steps of: passing gas upwardly through a bed of heated solid particles in a manner maintaining said particles as a first fluidized bed, contacting said liquid feed material with said fluidized particles at a temperature insufficient to effect any substantial chemical decomposition of said components while effecting vaporization of the said lower boiling components and leaving higher boiling components unvaporized, withdrawing and segregating overhead from said bed a vapor stream comprising lower boiling components of said liquid feed material, withdrawing at least a portion of said solid particles from the bed together with higher boiling liquid components of the feed material, passing gas upwardly through said withdrawn particles in a manner maintaining said particles as a second fluidized bed, supplying to said second fluidized bed sufficient heat to effect vaporization of said higher boiling liquid components without effecting substantial chemical decomposition of said last named components, withdrawing and segregating a second distillate vapor stream overhead from said second bed, and thereafter recycling said particles to the first mentioned fluidized bed, said process including the step of heating said solid particles at some point in the circulatory path of the particles extraneous to the said first fluidized bed.

3. The process defined by claim 2 in which said last named heating step occurs in the said second fluidized bed.

4. A process for the distillation of a liquid feed material having lower boiling components and higher boiling components which comprises the steps of: passing gas upwardly through a bed of heated solid particles in a manner maintaining said particles as a fluidized bed, contacting said liquid feed material with said fluidized particles at a temperature insufficient to effect any substantial chemical decomposition of said components while effecting vaporization of the said lower boiling components and leaving higher boiling components unvaporized, withdrawing and segregating overhead from said bed a vapor stream comprising lower boiling components of said liquid feed material, withdrawing at least a portion of said solid particles from the bed together with higher boiling liquid components of the feed material, contacting said withdrawn particles with a solvent adapted to wash said higher boiling liquid components from the solid particles, and segregating and recycling washed solid particles to the fluidized bed, said process including the step of heating at least a portion of said withdrawn particles extraneous to the fluidized bed.

5. The process defined by claim 4 including the step of recovering the higher boiling liquid components from the said wash solvent by distillation.

References Cited in the file of this patent

UNITED STATES PATENTS

| | | |
|---|---|---|
| 2,339,932 | Kuhl | Jan. 25, 1944 |
| 2,362,270 | Hemminger | Nov. 7, 1944 |
| 2,445,328 | Keith | July 20, 1948 |
| 2,543,884 | Weikert | Mar. 6, 1951 |
| 2,587,554 | Weikert | Feb. 26, 1952 |
| 2,635,684 | Joscelyne | Apr. 21, 1953 |